June 22, 1965 E. L. YUAN 3,190,766
METHOD OF MAKING VAPOR PERMEABLE SHEET MATERIALS
Filed Oct. 31, 1961
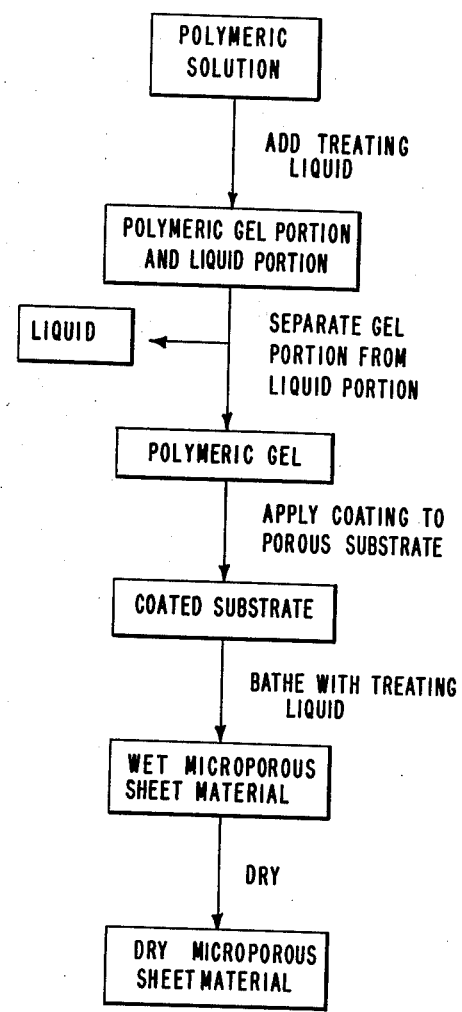
INVENTOR
EDWARD L. YUAN
BY Raymond E. Blomsted
ATTORNEY 3,190,766
METHOD OF MAKING VAPOR PERMEABLE SHEET MATERIALS
Edward L. Yuan, Cornwall on the Hudson, N.Y., assignor to E. I. du Pont de Nemours and Company, Wilmington, Del., a corporation of Delaware
Filed Oct. 31, 1961, Ser. No. 148,851
8 Claims. (Cl. 117—63)

This invention relates to a new and improved method of making vapor permeable sheet materials of the type which comprise a microporous polymeric layer. Preferred embodiments of the invention concern the manufacture of leather-like sheet materials having a microporous layer of durable extensible polymeric material in superposed adherence with a fabric or other porous fibrous sheet material.

There are many important uses for vapor permeable sheet materials comprising a mircoporous polymeric layer in the form of an unsupported film or in the form of an adherent coating on a porous reinforcing substrate. For example, shoe uppers, upholstery and clothing can be made from flexible vapor permeable sheet materials having a microporous extensible polymeric layer integrally united to a woven or nonwoven fabric. Sheet materials of this type are known which are very much like leather in durability, eye appeal and comfort characteristics.

Unfortunately, the desired balance of leather-like properties has not been obtainable by most of the previously known methods. Some of the best results to date have been obtained with methods comprising the steps of coating a fabric with a layer of a solution of an extensible polymer in a water miscible organic solvent, bathing the layer with water in vapor or liquid form until it is free of solvent and coagulated into a microporous structure, and then drying the resultant microporous layer. But even these most promising methods have left something to be desired. For example: uniform results have been difficult to achieve despite the use of exacting process controls; because the coating solution was limited to a relatively low polymer solids content, the dry coating thickness per coat was quite limited; much organic solvent was either wasted or had to be recovered from the water bath in a costly solvent recovery process.

The growing interest among several industries, particularly the shoe and upholstery industries, in the utility of the better quality man-made leather-like sheet materials has spurred the search for improved methods of making them. What is needed is a method which (1) permits the rapid and economical production of continuous lengths of the sheet material in any desired width; (2) is relatively easy to control; (3) consistently yields a high quality product; (4) permits the application of a relatively thick microporous layer in a single coat; and (5) is characterized by low waste and recovery costs.

It is therefore the primary object of this invention to provide a new and improved method of making vapor permeable sheet materials which are made up either partly or entirely of a microporous polymeric layer.

A more specific object is the provision of a method of making flexible vapor permeable sheet materials having a microporous extensible polymeric layer in superposed adherence with a fabric or other porous reinforcing substrate.

Another object is the provision of an economical, easily controlled method of making such sheet materials which are consistently competitive with shoe-upper leather in durability, eye appeal and comfort characteristics.

Other important objects will be apparent from the description of the invention which follows.

A simplified flow diagram of the process of this invention is illustrated by the drawing.

Broadly speaking, the novel method of this invention comprises (1) admixing a treating liquid with a solution of polymer in an organic solvent in an amount sufficient to enable the resulting mixture to be separated into a polymeric gel portion and a liquid portion, said treating liquid being water or another liquid which is a nonsolvent for the polymer, and said organic solvent and said treating liquid being at least partially miscible with each other; (2) separating and removing the gel portion from the liquid portion; (3) applying a layer of the separated gel to a substrate; (4) bathing the layer with a treating liquid as described in (1) until the layer is coagulated into a cellular structure of interconnected micropores and until the layer is substantially free of said organic solvent; and (5) drying the resulting microporous layer.

A preferred major polymeric component of the polymer solution when making leather-like sheet materials is a polyurethane elastomer made by reacting an organic diisocyanate with an active hydrogen containing polymeric material such as a polyalkyleneether glycol or a hydroxyl-terminated polyester to produce an isocyanate-terminated polyurethane prepolymer, and reacting the resulting prepolymer with a chain-extending compound having two active hydrogen atoms bonded to amino-nitrogen atoms. Hydrazine and N-methyl-bis-aminopropylamine are preferred chain extenders; however, others which are useful include dimethyl-piperazine, 4-methyl-m-phenylene-diamine, m-phenylene-diamine, 1,4-diamino-piperazine, ethylene diamine and mixtures thereof.

The polyurethane elastomer can be prepared by first mixing a molar excess of the diisocyanate with the active hydrogen containing polymeric material and heating the mixture at about 50–120° C. until the prepolymer is formed. Or, the diisocyanate can be reacted with a molar excess of the active hydrogen containing polymeric material, and the reaction product capped by reacting it with more diisocyanate to form the prepolymer.

Aromatic, aliphatic and cycloaliphatic diisocyanates or mixtures thereof can be used in forming the prepolymer. Such diisocyanates are, for example, tolylene-2,4-diisocyanate, tolylene-2,6-diisocyanate, m-phenylene diisocyanate, biphenylene 4,4'-diisocyanate, methylene bis(4-phenyl isocyanate), 4-chloro-1,3-phenylene diisocyanate, naphthalene-1,5-diisocyanate, tetramethylene-1,4-diisocyanate, hexamethylene - 1,6-diisocyanate, decamethylene-1,10-diisocyanate, cyclohexylene-1,4-diisocyanate, methylene bis-4-cyclohexyl isocyanate) and tetrahydronaphthalene diisocyanate. Arylene diisocyanates, that is, isocyanates in which the isocyanate groups are attached to an aromatic ring are preferred. In general they react more readily than do alkylene diisocyanates.

A polyalkyleneether glycol is the preferred active hydrogen containing polymeric material for the prepolymer formation. The most useful polyglycols have a molecular weight of 300 to 5000, preferably 400 to 2000, and include, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain such as, for example, the compound $HO(CH_2OC_2H_4O)_nH$ wherein $n$ is an integer greater than 1 can also be used.

Polyesters which can be used instead of or in conjunction with the polyalkyleneether glycols are, for example, those formed by reacting acids, esters or acid halides with glycols. Suitable glycols are polymethylene glycols, such as ethylene-, propylene-, tetramethylene-, decamethylene glycol, substituted polymethylene glycols such as 2,2-dimethyl-1,3-propanediol, cyclic glycols such as cyclohexanediol and aromatic glycols such as xylene glycol. Aliphatic glycols are generally preferred when maximum product flexibility is desired and when making microporous articles. These glycols are reacted with aliphatic, cycloaliphatic or aromatic dicarboxylic acids or lower alkyl esters or ester forming derivatives thereof to produce relatively low molecular weight polymers, preferably having a melting point of less than about 70° C., and molecular weights like those indicated for the polyalkyleneether glycols. Acids for preparing such polyesters are, for example, succinic, adipic, suberic, sebacic, terephthalic and hexahydroterephthalic acids and the alkyl and halogen substituted derivatives of these acids.

The chain extension reaction is usually carried out at a temperature below 120° C. and often at about room temperature, particularly for hydrazine-extended polymers. During the reaction, prepolymer molecules are joined together into a substantially linear polyurethane polymer, the molecular weight of which is usually at least 5000 and sometimes as high as 300,000. The reaction can be carried out without a solvent in heavy duty mixing equipment or it can be carried out in a homogeneous solution. In the latter case it is convenient to use as a solvent one of the organic solvents to be employed in the polymer solution from which the coating gel is formed.

Since the resulting polyurethane polymer has rubber-like resilience and extensibility, it is referred to as an "elastomer," although these properties may vary widely from product to product depending on the chemical structure of the polymer and the materials in combination with it.

Another highly useful elastomer for the manufacture of leather-like sheet materials in accordance with this novel method is a "carboxylic elastomer"; that is, the interpolymer of a monomer mixture containing a carboxylic acid and a conjugated diene having 4–10 carbon atoms. Usually the most desirable leather-like properties are obtained when the monomer mixture also contains a vinyl compound, and the elastomer product has an initial modulus below 0.9 gram per denier. I prefer to use the type of carboxylic elastomer which is a terpolymer of (1) a monoolefinic monocarboxylic acid having its olefinic double bond in the alpha-beta position with respect to the carboxyl group and containing a terminal methylene group, (2) a conjugated diene having 4–6 carbon atoms, and (3) a vinyl compound such as acrylonitrile, styrene or an ester of acrylic or methacrylic acid formed from an alcohol having 1–12 carbon atoms. I especially prefer a terpolymer of about 40–80% by weight of butadiene, 10–50% by weight of acrylonitrile and 2–25% of methacrylic acid or acrylic acid. Further description of such terpolymers and the methods by which they can be prepared are described in U.S. Patents 2,395,017 and 2,724,707, the disclosures of which are incorporated herein by reference. A preferred process for preparing them is described by H. P. Brown and C. J. Gibbs in "Carboxylic Elastomers," Rubber Chemistry and Technology, 28, p. 937 (1955).

Other substantially water-insoluble interpolymers containing carboxyl groups in the polymer chain are also useful in making the microporous polymeric layer by the method of this invention. These carboxylic polymers are the products of reacting at least one monomer containing both a carboxylic acid group and polymerizable olefinic unsaturation with at least one other monomer copolymerizable therewith.

When using a carboxylic polymer, the organic solvent of the polymer solution should be at least partially miscible with water. Also, the treating liquid used in the bathing step should contain water. A sufficient amount of polyvalent metal oxide crosslinking agent is blended with the carboxylic polymer to enable it to become crosslinked or cured in the bathing step to the extent necessary permanently to maintain the microporous cellular structure of the film or coating. About 5 to 10 parts by weight of the oxide per 100 parts by weight of the carboxylic polymer is usually sufficient. Zinc oxide is preferred, but other polyvalent metal oxides such as calcium-, magnesium-, dibutyl tin-, lead-, barium-, cobalt-, tin-, or strontium oxide can also be used. In the bathing step, the layer of polymeric gel is bathed not only until it is coagulated into a cellular structure of interconnected micropores but also until the cellular structure is stabilized against collapse.

It is preferable to blend sulfur with the preferred carboxylic elastomers, and to heat the bathed microporous layer until the elastomer therein is fully cured.

A vinyl chloride polymer is another preferred component of the polymer solution when making leather-like sheet materials. Superior product abrasion resistance is obtainable when a vinyl chloride polymer is used in combination with a polyurethane elastomer and/or a carboxylic elastomer. Useful vinyl chloride polymers include polyvinyl chloride and copolymers of a major proportion, preferably at least 80%, of vinyl chloride and a minor proportion of another ethylenically unsaturated monomer, such as vinyl acetate, vinylidene chloride, or diethyl maleate.

A large number of other polymers, either individually or in combination, can be used as the polymeric component of the solution from which the coating gel is formed. A polymeric component is selected which has a maximum elastic deformation strength, or "MEDS," of at least 100 pounds per square inch (preferably about 130–300 p.s.i.) from the time that the gel layer on the substrate has been bathed in accordance with the present method until the layer has been dried. The treating liquid and temperature used in the bathing and drying steps are additional factors which, along with the polymer properties, govern the MEDS, and a selection of these factors is made along with the properties of the particular polymeric component to be used in order to avoid allowing the MEDS of the polymeric component to fall below 100 p.s.i. Various additives which are sometimes present in the polymeric component, for example plasticizers, also affect the MEDS.

The MEDS of the polymeric component to be used in making the microporous layer is determined by measuring and plotting the stress-strain curve of a substantially void-free (e.g., solution cast) film of the polymeric component and drawing a straight line tangent and coincident with the initial straight portion of the stress-strain curve representing elastic deformation. MEDS is the stress at the point at which the aforementioned straight line departs from the stress-strain curve. The stress-strain data is preferably determined on an Instron Tensile Tester Model TTB at a speed of 100% elongation per minute using a one-half inch wide rectangular sample, usually about 10 to 20 mils thick, and one inch between grips. The test temperature to be used in determining the MEDS of a particular polymeric component by the method just described will be the highest temperature to which the microporous coating will be subjected in the practice of this invention during the bathing and drying steps. In order to reflect the effect of treating liquid during drying on the bathed product wet therewith, MEDS is measured on a void-free sample saturated and in equilibrium with the treating liquid. In essence, the polymeric component and treating liquid are coupled so that after the coating has been bathed and while it is removed from the bath and dried, the polymeric component in the coating has a MEDS above the aforementioned limit.

The polymeric component can have an initial MEDS somewhat below 100 p.s.i. if the MEDS thereof has been raised to at least 100 p.s.i. by the time the gel layer on the substrate has been bathed. One means of raising a deficient MEDS is by the polyvalent metal oxide reaction with carboxylic polymers during bathing in a water-containing treating liquid as described above.

Within the MEDS range specified above, the polymeric component of the solution from which the coating gel is formed can contain one or more of numerous types of polymers, which are exemplified by the following: polyurethanes, carboxylic polymers, vinyl halide polymers, polyamides, polyesteramides, polyesters, polyvinyl butyral, polyalphamethylstyrene, polyvinylidene chloride, alkyl esters of acrylic and methacrylic acids, chlorosulfonated polyethylene, copolymers of butadiene and acrylonitrile, cellulose esters and ethers, polystyrene and other polymers made from monomers containing vinyl groups.

When a polymer is used which is known to be compatible with plasticizers, for example a vinyl chloride polymer, it can be blended with known plasticizers therefor in an amount up to that which causes the MEDS to drop below 100 p.s.i. Other known additives for polymeric compositions can also be added to the polymeric component, such as pigments, fillers, stabilizers and antioxidants.

The polymer component selected is dissolved in enough organic solvent to yield a solution having the desired solids content and viscosity. The organic solvent should be one that is miscible, preferably completely miscible, with the treating liquid to be used in forming the separable gel mixture and in bathing the gel layer. N,N-dimethyl formamide is a preferred solvent for the polymers soluble therein in view of its high solvent power for many of the preferred polymers as well as its high miscibility with the generally preferred treating liquid including water. Other useful solvents include dimethyl sulfoxide, tetrahydrofuran, tetramethyl urea, N,N-dimethyl acetamide, N-methyl-2-pyrrolidone, ethyl acetate, dioxane, butyl carbinol, toluene, phenol, chloroform, and gamma-butyrolactone. Also useful are blends of these solvents with various water-miscible liquids, such as ketones and alcohols which alone are often poor solvents for the polymer. One very useful blend is composed of dimethyl formamide and methyl ethyl ketone.

Having prepared the polymer solution, a treating liquid is mixed therewith in sufficient quantity to render the resulting mixture separable into a polymeric gel portion and a liquid portion. In the majority of cases, the mixture will be separable substantially immediately after mixing is stopped. The treating liquid should be a nonsolvent for the polymer and at least partially miscible with the organic solvent used in preparing the polymer solution.

In a prior art method of making microporous sheet materials from a polymer solution similar to the polymer solution employed in this invention, a treating liquid is added to the polymer solution in sufficient quantity (a very accurately predetermined quantity) to bring it near, but short of, its gel point. At the desired endpoint the solution becomes a hazy or opalescent dispersion of finely divided polymer known as a "substantially colloidal dispersion." In that method, the treated solution at the preferred endpoint (of adding treating liquid) is not separable immediately or within a short period of time into a gel portion and a liquid portion. In fact, there is preferably no gel formed at all until the layer of treated solution is later bathed in a treating liquid. If any gel particles are formed, they are redispersed in the treated mixture rather than separated from the rest of the mixture. If the gel point is inadvertently passed, the mixture is generally considered unsatisfactory and is thrown away. This is because products made from the redispersed mixture tend to have poor strength and coarse pores. In the prior art method, processing is facilitated and product properties are at an optimum when the addition of treating liquid is stopped safely short of the gel point to insure the absence of gel particles from the colloidal polymeric dispersion that is formed.

Most unexpectedly, the advantageous results of the present invention are achieved by going at least to the gel point of the polymer solution, and preferably slightly past it, thereby forming numerous polymeric gel particles. When sufficient treating liquid has been added and mixing stops, the mixture tends to separate into two distinct layers, a liquid layer and a layer of agglomerated gel particles in the form of a gelatinous or jelly-like mass, referred to herein as the gel portion. The gel portion can be separated from the liquid portion by decantation, centrifugation, and other methods known to be useful for separating gelatinous masses from liquids. Centrifuge separation can usually be started as soon as the treating liquid has been added. Although it is usually preferable to carry out the separation within an hour or two after the treating liquid is added, useful results are obtained when the mixture is allowed to stand for an extended period of time, for example from about 1 to 7 days, before separating the gel portion from the liquid portion.

The gel portion contains most of the polymer plus part of the organic solvent and treating liquid. The liquid portion is composed mostly of organic solvent and treating liquid; it also contains much of any very low molecular weight polymer that was present in the solution because of the relatively high solubility of the low molecular weight fraction in the solvent-treating liquid mixture.

Treating liquids which can be admixed with the polymer solution to take it at least to its gel point include water, ethylene glycol, glycerol, glycol monoethyl ether, hydroxyethyl acetate, tertiary butyl alcohol, 1,1,1-trimethylol propane, methanol, ethanol, acetone, hexane, benzene, naphtha toluene tetrachloroethylene chloroform and the like. When operable, water and blends thereof with water-miscible liquids are usually preferred.

While it is not really necessary in the practice of this invention to predetermine the amount of treating liquid to be added, it is often desirable to do so, especially when the method is to be operated by automation. When an experienced operator is present he can usually tell when the gel point is reached by the marked change in appearance and viscosity of the mixture. Since it is preferable to go at least slightly past the gel point, the addition of a little more treating liquid after the gel point is reached is desirable. Thus, there is no sharp endpoint requiring precise control and predetermination of the exact amount of treating liquid to be added. And there is little or no danger of overshooting a desirable point for stopping the addition of treating liquid.

As the mixture passes through the gel point in the step of adding the treating liquid, its rheological properties undergo a sharp change from a highly fluid consistency to a viscous paste or applesauce-like consistency. I prefer to add slowly with stirring just enough more treating liquid to change the consistency of the mixture to a highly fluid slurry of polymeric gel particles. This can usually be accomplished with an additional 1-20 percent of treating liquid. The addition of still more treating liquid tends to increase the viscosity and solids content of the separated gel portion. The best amount to add is governed largely by the initial solution viscosity and percent solids and by the gel portion viscosity that is best adapted to the method and conditions to be employed in applying the gel layer to the substrate.

Predetermination of the best amount of treating liquid to add is easily done by measuring the amount of treating liquid required to render separable a small sample of the body of solution to be used and to give the separated gel portion the desired viscosity and solids content, and then calculating the proportionate amount of liquid to be added to the body of solution.

Before the water or other treating liquid is added to the polymer solution, it is preferably blended with a substantial proportion, for example, from about 2 to 5 times its own weight, of an organic solvent of the type used in preparing the polymer solution. Addition of the treating liquid to the solution should be done gradually and with stirring to prevent localized coagulation.

After the treating liquid has been added to the polymer solution and the polymeric gel component has been separated from the resulting mixture, a layer of the gel is applied to a substrate. The gel can be rendered more fluid and thus better adapted to some of the most practical coating methods by being vigorously stirred or agitated immediately before and/or during its application to the substrate. Useful coating methods are exemplified by doctor-knifing, extruding, dipping, rolling and brushing.

Leather replacements and other composite reinforced vapor permeable sheet products are produced by applying a layer of the gel to one or both sides of a flexible porous fibrous substrate, for example a nonwoven fabric, a waterleaf, a woven or knitted fabric, leather, suede, or a manmade leather-like or suede-like sheet material. Or the gel layer can be interposed as a bonding layer between such sheet materials. The fibers of the substrate can be natural or synthetic, crimped or straight, organic or inorganic, continuous filament or staple, or of papermaking length. When bathed and dried, the layer of gel becomes a microporous polymeric layer integrally united to the substrate.

An unsupported microporous film or sheet is obtained by applying the layer of gel to a removable substrate, preferably a smooth impervious substrate such as polished glass, stainless steel, aluminum foil, plastic film, or a fibrous substrate coated with a release coating, followed by the requisite bathing, drying and stripping operations.

The substrate-supported layer of polymer gel is bathed with a treating liquid as described above, that is, with water or another liquid which is a nonsolvent for the polymer and which is at least partially miscible with the organic solvent used in the polymer solution. Preferably the gel layer is immediately immersed and soaked in the liquid. However, the bathing operation can also be performed by subjecting the layer to a spray or a vapor of the bathing liquid, or by a combination of these and other known bathing methods. "Bathing" means causing the treating liquid, either as a liquid or a vapor, to come in contact with the gel layer.

The gel layer is bathed for a sufficient time and at a sufficient temperature to coagulate it into a cellular structure of interconnected micropores. All or nearly all of the organic solvent in the layer should be removed by the bathing liquid to prevent substantial or total loss of porosity due to collapse of the cellular structure in the drying step which follows. When using a carboxylic elastomer I prefer to start the bathing with liquid at about room temperature and then to finish the bathing with liquid at about 80–100° C. to achieve rapid and effective stabilization of the microporous structure.

Finally, the bathed microporous layer is dried, preferably in a heat zone in which there is forced air circulation.

When the microporous films obtainable by this novel method are integrally united during or after their formation to porous fibrous substrates, it is possible to make leather-like sheet materials having advantages over prior leather replacements as well as over genuine leather for many applications. For example, shoe-upper material is obtainable which combines leather-like appearance, durability and comfort characteristics with freedom from the wide periodic fluctuation in cost and variation in properties known to characterize genuine leather. Moreover, the availability of the product in continuous lengths and any desired width in substantially uniform and blemish-free quality gives it a distinct advantage over leather for such applications as upholstery, luggage, table and roll coverings, ink rollers and sport jackets.

The method of this invention is adaptable to the rapid and economical production of vapor permeable sheet materials composed partly or entirely of a microporous polymeric layer. A consistent yield of uniformly high quality shoe-upper material and the like is readily obtainable by this method.

An important advantage of this method over the closest prior art is the marked physical change which occurs during the addition of treating liquid just prior to the optimum endpoint range. Thus, there is ample warning that the desired endpoint is near. Also, the optimum endpoint range is broad enough so that a couple of drops more or less of treating liquid will not spell success or failure of the mixture. These are important factors in the method's ease of control, speed and economy of operation, and consistent results.

Another advantage is the elimination of the lower molecular weight fractions of the polymers in the liquid portion removed from the gel. This is a significant factor in upgrading product quality and uniformity of quality. Variations introduced by different batches of polymers are reduced to a minimum.

Three of the major advantages which result from the fact that the gel applied to the substrate is coatably fluid at an unusually high polymeric solids content are: (a) fewer coats are required to build up the desired dry coating thickness; (b) less bathing time is needed to coagulate the freshly applied gel layer and to remove the solvent therefrom; (c) less solvent is introduced into the bathing liquid; and the solvent removed with the liquid portion is relatively inexpensive to recover by known solvent recovery techniques.

The examples which follow are given for the purpose of illustrating the invention. All quantities shown are on a weight basis unless otherwise indicated.

*Example 1*

A 20% solution of polyurethane elastomer is prepared by first mixing 3343 parts of polytetramethyleneether glycol of about 1000 molecular weight with 291 parts of tolylene-2,4-diisocyanate and heating the mixture for 3 hours at 90° C. Then 2485 parts of the resulting hydroxyl-end-group containing dimer are mixed with 570 parts of methylene-bis-(4-phenyl-isocyanate). This mixture if heated for one hour at 80° C., yielding a prepolymer with isocyanate end groups. The prepolymer is dissolved in 10,000 parts of N,N-dimethyl formamide (sometimes referred to simply as dimethylformamide), and the resulting solution is added slowly to a solution consisting of 50 parts of chain extender dissolved in 1710 parts of dimethyl formamide. The chain extender consists of hydrazine hydrate. The resulting reaction mixture is stirred at 40° C. for 30 minutes to form a polyurethane solution having a viscosity of about 115 poises and a polymer content of about 20%.

A polymer solution consisting of 10.5% polyurethane elastomer, 5.7% polyvinyl chloride and 83.8% dimethyl formamide is prepared by admixing a 12% solution in dimethyl formamide of polyvinyl chloride with a suitable amount of the 20% polyurethane solution. The MEDS (maximum elastic deformation strength) of the polymeric component of this solution is found to be 180 p.s.i. by casting a void-free film from a sample of the solution, soaking it in water for several days, and carrying out the MEDS determination as previously described. At 100° C., the temperature to be used for drying the coated fabric in this example, the film has a MEDS of over 100 p.s.i.

Next, 23 parts of a treating liquid consisting of a 1:4 blend of water and dimethyl formamide are gradually added to 100 parts of the polymer solution with stirring. When 20.3 parts of the treating liquid have been added, the polymer solution is a substantially colloidal opalescent polymeric dispersion. As the remainder of the treating liquid is added, the mixture first rapidly changes from a highly fluid liquid to a paste-like consistency resembling that of applesauce; then in the final moments of treating liquid addition the mixture becomes a highly fluid slurry of polymeric gel particles. Stirring is stopped a few seconds after the last of the treating liquid has been added.

Almost immediately the mixture separates on standing into two distinct layers, a lower gelatinous layer and an upper liquid layer. The separation into layers is carried to completion at an accelerated rate in a centrifuge which is spun for 15 minutes at 2000 r.p.m. Then the liquid portion is decanted from the gel portion.

The liquid portion consists of dimethyl formamide, water and traces of non-gelled low molecular weight polymer. The gel portion, a jelly-like thixotropic mass, has a polymer content of 22.5%, a water content of 3.4% and a dimethyl formamide content of 74.1%.

The separated gel is stirred until it is a smooth creamy fluid. Then it is applied by means of a doctor knife to one side of a porous nonwoven fabric to a wet film thickness of 50 mils (0.050 in.). The nonwoven fabric is a polyurethane elastomer impregnated fibrous sheet prepared in accordance with the teaching in Example 1 of U.S. patent application S.N. 835,431 filed August 24, 1959. It weighs 6.5 ounces per square yard and is made by needle-punching a batt of 0.5 denier retractable poly(ethyleneterephthalate) fibers followed by impregnation with about 35%, based on the batt's fiber content, of a hydrazine-extended polyurethane elastomer similar to the one described above in this example. The coating operation is carried out in a zone having a temperature of 21° C. and a relative humidity of 20%.

The layer of polymeric gel applied to the nonwoven fabric is coagulated by floating the coated material coating-side-down on a body of water at 16° C. for 30 seconds, followed by completely immersing it in the water for 1.5 hours to remove substantially all of the dimethyl formamide. The resulting bathed polymeric layer has a cellular structure of interconnected micropores. It is substantially free of micropores.

Finally, the coated fabric is dried in a 100° C. heat zone. When dry, the microporous polymeric coating is white in color, about 20 mils in thickness, and it is highly permeable to water vapor. It can be colored, buffed and otherwise subjected to finishing operations known to be useful on leather and leather replacements. It can also be given a heat treatment at 165° C. for 5 minutes with a resulting improvement in abrasion resistance.

The product is useful as a leather replacement material for shoe uppers, upholstery, handbags, jackets, caps, hat linings and bearings.

Especially important properties of the product with respect to its utility as a shoe-upper material are: (a) its comfort characteristics such as flexibility, softness on the foot-contacting fibrous substrate side, breathability, and capacity to repel water when worn in the rain; (b) its appearance and finishing characteristics, including the absence of micropores throughout the thickness of the coating, thus allowing the surface to be subjected to such finishing operations as napping, buffing, polishing, staining and embossing without danger of exposing unsightly holes; and (c) its durability, including resistance to tearing, repeated flexing and abrasion.

Similar results are obtained if Example 1 is repeated except for the addition of 22 parts of treating liquid instead of 23 parts. The polymer content of the separated gel is slightly lower, and a slightly thicker wet film is applied to the fabric to obtain the same 20 mil thickness after drying.

*Example 2*

The following composition is blended on a two-roll rubber mill:

| | Parts by weight |
|---|---|
| Carboxylic polymer* | 100.0 |
| Zinc oxide | 5.0 |
| Sulfur | 0.5 |
| Accelerator (tetramethyl-thiuram disulfide) | 1.5 |
| Antioxidant [2,2 methylene bis (4 methyl 6 tertiary butyl phenol)] | 2.0 |
| | 109.0 |

*The rubbery terpolymer product of copolymerizing 69 parts butadiene, 26.5 parts acrylonitrile and 4.5 parts methacrylic acid.

A 25% solution of the above milled composition in dimethyl formamide and a 10% solution of polyvinyl chloride in dimethyl formamide are blended in sufficient proportions to yield a polymeric solution in which the rubbery terpolymer: polyvinyl chloride weight ratio is 65:35.

Example 1 is repeated with the following exceptions:
(a) The polymer solution used in Example 1 is replaced with the polymer solution just described.
(b) The bathing and drying steps are as follows:

The layer of polymeric solution applied to the fibrous substrate is coagulated by floating the coated material coating side down on a body of water at 16° C. for 30 seconds, followed by completely immersing it in the water for 30 minutes to remove most of the dimethyl formamide. The resulting bathed gelatinous polymeric layer has an intercommunicating microporous cellular structure.

The rubbery terpolymer in the gelatinous layer is partially cured without damage to the cellular structure by immersing the coated material in water at 80–90° C. for 20 minutes. Then the coated material is immersed in water at 16° C. for one hour to insure substantially complete removal of dimethyl formamide.

Solvent-free, and with the cellular structure of the coating stabilized against collapse, the coated material is dried in a 100° C. heat zone. The cure of the rubbery terpolymer in the coating is completed by heating the coated material in a 150° C. oven for 30 minutes.

The product has similar properties and utility to the product of Example 1.

If Example 2 is repeated except that instead of immersing the coagulated coating in water at 80–90° C. for 20 minutes it is immersed in water at 16° C. for 2 hours, a non-porous coating and therefore a non-breathable product is obtained. The 2-hour immersion in cold water does not stabilize the cellular structure of the coating against collapse in the subsequent heating steps, presumably because it does not raise the MEDS of the polymeric component to at least 100 p.s.i.

I claim:

1. A method of making vapor permeable sheet materials which comprises (a) admixing a treating liquid with a solution of polymer in an organic solvent in an amount sufficient to render the resulting mixture separable into a polymeric gel portion and a liquid portion, said solvent and said treating liquid being at least partially miscible with each other, and said treating liquid being a nonsolvent for the polymer; (b) separating and removing the gel portion from the liquid portion; (c) coating a porous substrate with a layer of gel; (d) bathing the layer of gel with a treating liquid as defined in step (a) until the layer is coagulated into a cellular structure of interconnected micropores and until the layer is substantially free of said organic solvent; and (e) drying the resulting microporous layer, said polymer having a maximum elastic deformation strength of at least 100 pounds per square inch from the time the layer of gel has been bathed until it has been dried.

2. A method as defined in claim 1 wherein said polymer comprises a polyurethane elastomer formed by reacting an organic diisocyanate with an active hydrogen containing polymeric material selected from the group consisting of polyalkyleneether glycols and hydroxyl-terminated polyesters to produce an isocyanate-terminated polyurethane prepolymer, and reacting the resulting prepolymer with a chain extender comprising a compound having two active hydrogen atoms bonded to aminonitrogen atoms.

3. A method as defined in claim 1 wherein said polymer comprises the carboxylic elastomer product of reacting (a) a monoolefinic monocarboxylic acid having its olefinic double bond in the alpha-beta position with respect to the carboxyl group and containing a terminal methylene group, (b) a conjugated diene having 4–6 carbon atoms and (c) an acrylic nitrile.

4. A method as defined in claim 1 wherein said polymer consists essentially of a blend of a vinyl chloride polymer and a polymer selected from the group consisting of polyurethane elastomers formed by reacting an organic diisocyanate with an active hydrogen containing polymeric material selected from the group consisting of polyalkyleneether glycols and hydroxyl-terminated polyesters to produce an isocyanate-terminated polyurethane prepolymer, and reacting the resulting prepolymer with a chain extender comprising a compound having two active hydrogen atoms bonded to amino-nitrogen atoms, and the carboxylic elastomer product of reacting (a) a monoolefinic monocarboxylic acid having its olefinic double bond in the alpha-beta position with respect to the carboxyl group and containing a terminal methylene group, (b) a conjugated diene having 4–6 carbon atoms and (c) an acrylic nitrile.

5. A method as defined in claim 1 wherein said treating liquid comprises water.

6. A method as defined in claim 1 wherein said organic solvent comprises dimethyl formamide.

7. A method as defined in claim 1 wherein said substrate is a porous fibrous sheet material, and the dried microporous layer is integrally united thereto.

8. A method as defined in claim 1 wherein the gel portion is separated and removed from the liquid portion substantially immediately after the treating liquid has been added to the solution.

References Cited by the Examiner

UNITED STATES PATENTS

| | | | |
|---|---|---|---|
| 2,783,894 | 3/57 | Lovell | 260—34.2 XR |
| 2,809,900 | 10/57 | Sarbach | 117—10 |
| 2,819,981 | 1/58 | Schornstheimer et al. | 117—63 |
| 2,948,691 | 8/60 | Windemuth et al. | 117—139.5 XR |
| 3,000,757 | 9/61 | Johnson et al. | 117—135.5 XR |
| 3,067,482 | 12/62 | Hollowell | 117—63 XR |
| 3,100,721 | 8/63 | Holden | 117—135.5 |

WILLIAM D. MARTIN, *Primary Examiner.*
RICHARD D. NEVIUS, *Examiner.*